United States Patent [19]

Uesugi et al.

[11] Patent Number: 4,619,344

[45] Date of Patent: Oct. 28, 1986

[54] COMPOSITE SOUND AND HEAT INSULATING BOARD

[75] Inventors: Naomoto Uesugi, Tokyo; Shoji Suzuki, Aichi, both of Japan

[73] Assignee: Honda Giken Kogyo Kabushiki Kaisha, Tokyo, Japan

[21] Appl. No.: 777,271

[22] Filed: Sep. 18, 1985

Related U.S. Application Data

[63] Continuation of Ser. No. 596,289, Apr. 3, 1984, abandoned.

[30] Foreign Application Priority Data

Apr. 28, 1983 [JP] Japan .................................. 58-075464
Apr. 28, 1983 [JP] Japan .................................. 58-075465

[51] Int. Cl.$^4$ ........................................... F02M 35/00
[52] U.S. Cl. ..................................... 181/229; 181/256
[58] Field of Search ........................ 181/229, 256, 294

[56] References Cited

U.S. PATENT DOCUMENTS

| | | | |
|---|---|---|---|
| 3,058,863 | 10/1962 | Gaines et al. | 428/282 |
| 3,775,208 | 11/1973 | Grigoleit et al. | 428/297 |
| 4,201,823 | 5/1980 | Russell | 428/285 |
| 4,302,499 | 11/1981 | Grisch | 428/285 |
| 4,357,387 | 11/1982 | George et al. | 428/285 |
| 4,375,493 | 3/1983 | George et al. | 428/285 |
| 4,471,018 | 9/1984 | Kritchevsky et al. | 428/285 |

Primary Examiner—James J. Bell
Attorney, Agent, or Firm—Birch, Stewart, Kolasch & Birch

[57] ABSTRACT

A composite sound and heat insulating board comprising a base layer consisting of a compacted mat of filaments, and an additional layer of a material which differs in hardness than the compacted mat, wherein one surface of the base layer is securely attached to one surface of the additional layer. The compacted fiber mat may be composed of filaments of an organic composition, filaments of an inorganic composition, or partially of filaments of an organic composition and partially of filaments of an inorganic composition. The additional layer of the composite board is constructed of a naturally occurring or synthetic resin such as, for example, a relatively hard thermosetting or thermoplastic synthetic resin, or a relatively soft material which is lower in hardness than the compacted fiber mat. The composite board is advantageous when used in association with a source of heat and noise such as, for example, an internal combustion engine of a power driven vehicle.

11 Claims, 16 Drawing Figures

COMPOSITE SOUND AND HEAT INSULATING BOARD

This application is a continuation, of copending application Ser. No. 596,289, filed on Apr. 3, 1984 now abandoned.

FIELD OF THE INVENTION

The present invention relates to a composite sound and heat insulating board and, particularly, to a composite sound and heat insulating board which is useful when incorporated into a power driven vehicle having a source or sources of vibrations and heat such as the internal combustion engine installed on the vehicle.

BACKGROUND OF THE INVENTION

An internal combustion engine installed on an automotive vehicle or a motorcycle generates heat and noises when the engine is in operation and thus constitutes an important source of heat and noises in the vehicle. The heat and vibrations originating in the internal combustion engine are transferred to the air cleaner and other units and members located in the neighborhood of the engine or structurally connected to the engine. The heat and vibrations transferred to these members and units are liable to impair the performances and lessen the service lives of the members and units. The vibrations transferred to, for example, the casing of the engine or the front engine hood panel may cause these members to resonate and produce noises therefrom. It is thus required to have the engine per se or the structurally or functionally associated members and units provided with sound and heat insulating means. Conventional sound and heat insulating means to meet the purpose are however not fully acceptable.

SUMMARY OF THE INVENTION

It is accordingly an important object of the present invention to provide an improved composite sound and heat insulating board which is adapted for use not only in a power driven vehicle of any kind but in any other devices which produce heat and vibrations when operative.

It is another important object of the present invention to provide an improved composite sound and heat insulating board which is simple in construction and which is easy and economical to manufacture.

In accordance with the present invention, there is provided a composite sound and heat insulating board comprising a base layer consisting of a compacted mat of filaments, and an additional layer of a material which differs in hardness than the compacted mat, one surface of the base layer being securely attached to one surface of the additional layer. The fiber mat forming part of the composite board thus constructed may be composed of filaments of an organic composition, filaments of an inorganic composition, or partially of filaments of an organic composition and partially of filaments of an inorganic composition. The additional layer of the composite board is constructed of a plastic material which may be a relatively hard thermosetting or thermoplastic synthetic resin and is higher in hardness than the compacted fiber mat, or a relatively soft material lower in hardness than the fiber mat.

The base layer and the additional layer of a composite sound and heat insulating board according to the present invention may respectively constitute a first base layer and a first additional layer. In this instance, the composite board further comprises a second base layer consisting of a compacted mat of filaments, and a second additional layer of a material which differs in hardness from the compacted fiber mat forming the second additional layer, one surface of the first base layer being securely attached to one surface of the first additional layer, one surface of the second additional layer being securely attached to the other surface of the first base layer and the other surface of the second additional layer being securely attached to one surface of the second base layer. The compacted mats respectively forming the first and second base layers are preferably composed of filaments of the same material and, likewise, the first and second additional layers are preferably constructed of the same material. Alternatively, a composite sound and heat insulating board according to the present invention may further comprise a foil of metal securely attached to the other surface of the base layer. In a composite sound and heat insulating board according to the present invention, furthermore, the additional layer may constitutes a first additional layer. In this instance, the composite board further comprises a second additional layer of a material which differs in hardness from the compacted fiber mat forming the additional layer, one surface of the base layer being securely attached to one surface of the first additional layer and the other surface of the base layer being securely attached to one surface of the second additional layer. The first and second additional layers of such a composite sound and heat insulating board are also preferably constructed of the same material.

BRIEF DESCRIPTION OF THE DRAWINGS

The features and advantages of a composite sound and heat insulating board according to the present invention will be more clearly appreciated from the following description taken in conjunction with the accompanying drawings in which like reference numerals designate similar or corresponding members and elements and in which.

DESCRIPTION OF THE PREFERRED EMBODIMENTS

Figure 1:
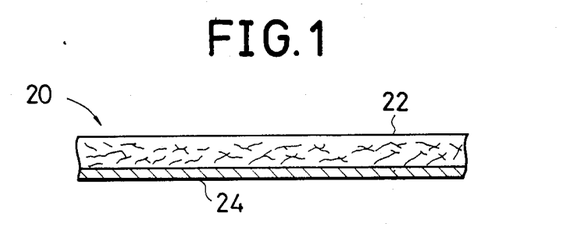
FIG. 1 is a fragmentary cross sectional view showing a preferred embodiment of a composite sound and heat insulating board according to the present invention.

Referring to FIG. 1 of the drawings, a composite sound and heat insulating board embodying the present invention is designated in its entirety by reference numeral 20 comprises a base layer constituted by a compacted fiber mat 22. The compacted fiber mat 22 is composed of relatively long staple fibers or filaments of an organic or inorganic composition or of organic and inorganic compositions. Typical examples of the organic composition are polyesters and polyvinyl chloride and typical examples of the inorganic composition are ceramics and fiber glass. In the embodiment shown in FIG. 1, the compacted fiber mat 22 constituting the base layer of the composite board 20 is assumed to be composed of fiber glass by way of example. The compacted fiber mat 22 is thus produced by cutting continuous elements of fiber glass to suitable lengths, mixing the lengths of fiber glass together, forming the resultant fibers into a layer, pressing the layer between rollers into the form of a mat, and needling the mat so that the fibers forming the mat are caused to twine together. The mat of the fiber glass thus obtained is dipped in or sprayed or otherwise coated with a binder of an organic composition such as water glass. The mat is then baked under pressure and is thereafter cut or punched out into a desired shape.

A composite sound and heat insulating board according to the present invention further comprises an additional layer of a material which differs in hardness from the main layer and which is securely attached to one surface of the main layer. In the embodiment shown in FIG. 1, such an additional layer is formed of a material higher in hardness than the material of the base layer and is constituted by a hard web 24 constructed of a suitable relatively hard thermosetting synthetic resin such as for example a phenol resin, an epoxy resin or a polyester. Where a thermosetting synthetic resin of a liquid state is used, the material is applied to the surface of the compacted fiber mat 22 preferably by spraying or brushing. If the material of the relatively hard web 24 is in sheet form, the sheet of the material is bonded to the surface of the compacted fiber mat 22 with use of a suitable adhesive. If, furthermore, a composite board according to the present invention is to be used where relatively low ambient temperatures prevail, the hard web 24 which forms part of the composite board 20 embodying the present invention may be constructed of a thermoplastic synthetic resin.

The composite sound and heat insulating board 20 thus composed of the compacted fiber mat 22 and the hard web 24 may be deformed into any shape to suit the application of the board. For this purpose, the flat composite board 20 is placed in a suitable mold and is pressed into the desired shape by means of, for example, a hydraulic press at a suitable process temperature and for a suitable period of time. The shaped composite board 20 is removed from the mold and is trimmed or otherwise treated appropriately for the purpose for which the board is to be used. The composite sound and heat insulating board 20 produced in these manners may be used either with the compacted fiber mat 22 exposed as an outer layer or with the hard web 24 exposed as an outer layer, or either with the compacted fiber mat 22 located closer to the source or sources of heat and noise than the hard web 24 or with the hard web 24 located closer to the source or sources than the compacted fiber mat 22.

Where the hard web 24 which forms part of the composite board 20 embodying the present invention is constructed of a thermoplastic synthetic resin as mentioned above, the thermoplastic synthetic resin is applied to the compacted fiber mat 22 after the compacted fiber mat 22 produced as above described is once heated. The compacted fiber mat 22 thus having the coating of the thermoplastic synthetic resin is placed into a suitable mold and is pressed into the shape to suit the application of the board.

In the composite sound and heat insulating board embodying the present invention, the base layer constituted by the compacted fiber mat 22 excels in heat insulation due to the excellent heat insulating property of the fiber glass forming the mat. The hard web 24 used in combination with such a base layer provides added resistance to heat of the composite board. In practical applications, it is for these reasons preferable to have the compacted fiber mat 22 located closer to the source or sources of heat than the hard web 24 for exploiting the heat insulating performance of the board as a whole. The compacted fiber mat 22 of the composite board 20 further serves to absorb noise and the hard web 24 serves as means to isolate noise. For this reason, it is preferable to have the compacted fiber mat 22 located closer to the source or sources of noise than the hard web 24 for exploiting the noise insulating performance of the board as a whole. Since each of the compacted fiber mat 22 and the hard web 24 of the board 20 is lower in natural frequency than, for example, sheet steel, the composite board 20 causes resonance less than a steel panel. The sound absorbing performance of the compacted fiber mat 22 can be controlled by selecting the thickness and/or density of the mat.

The raw materials to form the component layers of the composite board 20 embodying the present invention are commercially available at low prices and are easy to be formed into the compacted fiber mat 22 and hard web 24, respectively. The composite board 20 can therefore be manufactured at a low cost as compared with a pressed sound and heat insulating panel of sheet steel or a composite sound and heat insulating board of a molded synthetic resin. Such a composite board 20 may be utilized not only as a non-load-bearing structural member such as a casing, an enclosure or a dust cover but also as a load-bearing member to be subjected to, for example, a tensile stress since the compacted fiber mat 22 which forms part of the board 20 provides an effect similar to the effect of fiber reinforced plastics and accordingly has considerable degrees of rigidity and tensile strength.

Where the compacted fiber mat 22 of the composite sound and heat insulating board 20 embodying the present invention is formed of filaments of an organic composition which are relatively low in specific gravity as well known in the art, not only the composite board 20 as a whole is relatively light in weight but the hard web 24 forming part of the board 20 will be enabled to firmly fit to the compacted fiber mat 22. If, furthermore, the composite board 20 is used in such a manner that the hard web 24 thereof is exposed as an outer layer, the external appearance of the board 20 can be improved by selecting the color of the thermosetting or thermoplastic resin to form the hard web 24 or by applying a colored coating to the outer surface of the hard web 24.

Figure 2:
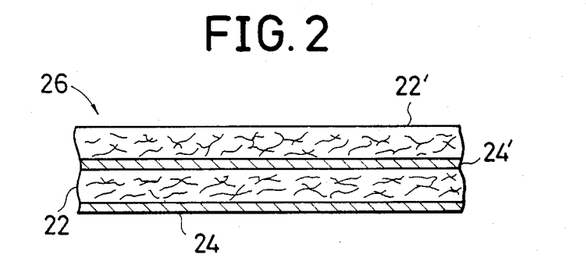
FIG. 2 is a view similar to FIG. 1 but shows a modification of the composite sound and heat insulating board illustrated in FIG. 1.
Figure 3:
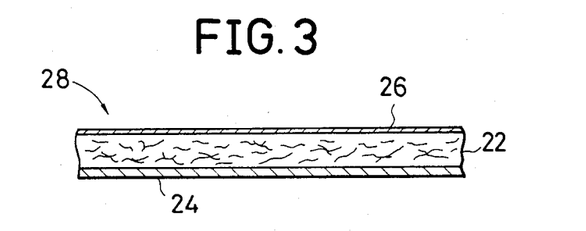
FIG. 3 is also a view similar to FIG. 1 but shows another modification of the composite board illustrated in FIG. 1.
Figure 4:
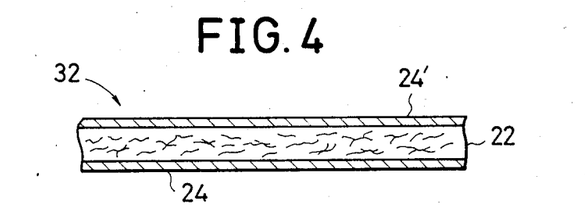
FIG. 4 is also a view similar to FIG. 1 but shows still another modification of the composite board shown in FIG. 1.

FIGS. 2 to 4 of the drawings show modifications of the embodiment hereinbefore described with reference to FIG. 1.

In FIG. 2, a composite sound and heat insulating board designated in its entirety by reference numeral 26 is shown comprising first and second compacted fiber mats 22 and 22' and first and second hard webs 24 and 24'. Each of the first and second compacted fiber mats 22 and 22' is similar to the compacted fiber mat 22 of the above described composite board 20 and, likewise, each of the first and second hard webs 24 and 24' is similar to the hard web 24 of the composite board 20. The first compacted fiber mat 22 is securely attached to one surface of the first hard web 24, which in turn has the other of its surfaces securely attached to one surface of the second compacted fiber mat 22'. The other surface of the second compacted fiber mat 22' is securely attached to one surface of the second hard web 24'. Thus, the composite board 26 shown in FIG. 2 is composed of the combination of two composite boards each similar to the composite board 20 of FIG. 1 and is adapted to provide a doubled sound and heat insulating performance as compared with the composite board 20. It is a matter of course that the embodiment of FIG. 2 may if desired be further modified to have at least one combination of an additional compacted fiber mat and an additional hard web so that the compacted fiber mats and hard webs of the composite board having three or more combinations of the compacted fiber mat and hard web are laminated alternately to one another.

In FIG. 3, a composite sound and heat insulating board designated in its entirety by reference numeral 28 is shown comprising a foil of metal such as an aluminum foil 30 in addition to a compacted fiber mat 22 and a hard web 24 similar to those of the composite board 20 shown in FIG. 1. The compacted fiber mat 22 has one of its surfaces securely attached to one surface of the compacted fiber mat 22 and the other of its surfaces bonded or otherwise securely attached to one surface of the aluminum foil 30 so that the compacted fiber mat 20 is sandwiched between the compacted fiber mat 22 and the aluminum foil 30. The aluminum foil 30 thus forming part of the composite board 29 shown in FIG. 3 is useful for providing added sound and heat insulating performances and further for preventing the fibers forming the compacted fiber mat 22 from being disintegrated and falling out of the mat during handling and use of the board 29. The compacted fiber mat 22 being sandwiched between the hard web 24 and the aluminum foil 30, the composite board 28 as a whole has a reduced natural frequency and an improved sound damping performance and will provide an excellent noise suppression effect.

In FIG. 4 of the drawings, a composite sound and heat insulating board designated in its entirety by reference numeral 32 is shown comprising a compacted fiber mat 22 similar to the compacted fiber mat of the composite board 20 shown in FIG. 1 and a pair of hard webs 24 and 24' each similar to the hard web 24 of the composite board 20 of FIG. 1. The compacted fiber mat 22 is sandwiched between the two hard webs 24 and 24' and thus has one of its surfaces securely attached to one surface of one hard web 24 and the other of its surfaces securely attached to one surface of the other hard web 24'. When compared with the composite board 20 is FIG. 1, the composite board 32 constructed in this fashion is useful for providing increased sound and heat insulating performances and preventing the fibers forming the intermediate compacted fiber mat 22 from being disintegrated and falling out of the mat during handling and use of the board 32 as in the case of the composite board 28 shown in FIG. 3. The compacted fiber mat 22 being sandwiched between the hard webs 24 and 24', furthermore, the composite board 32 as a whole also has a reduced natural frequency and an improved sound damping performance and will thus provide an increased degree of noise suppression effect as in the embodiment of FIG. 3.

Figure 5:
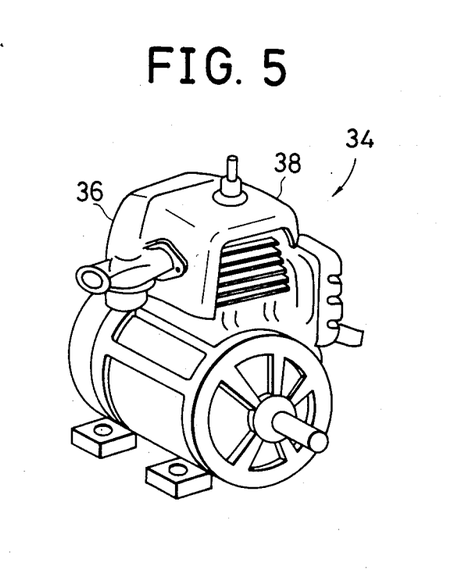
FIG. 5 is a perspective view showing a vehicle engine using a composite sound and heat insulating board embodying the present invention as a structural member thereof.
Figure 6:
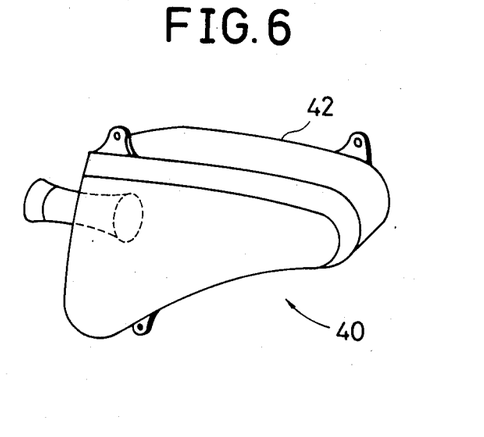
FIG. 6 is a perspective view showing an engine air cleaner using a composite sound and heat insulating board embodying the present invention as a structural member thereof.
Figure 7:
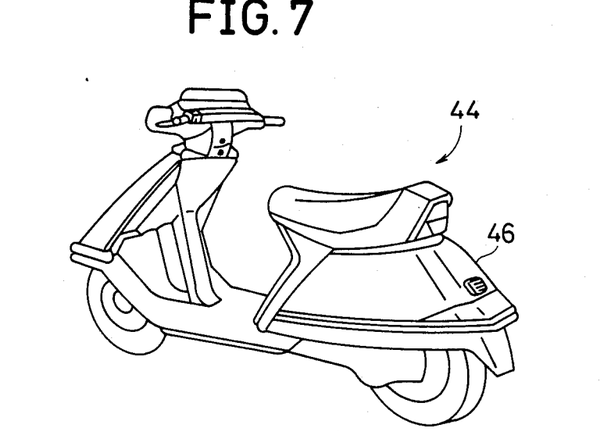
FIG. 7 is a perspective view showing a scooter using a composite sound and heat insulating board embodying the present invention as a structural member thereof.
Figure 8:
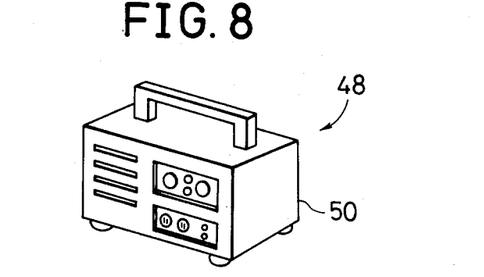
FIG. 8 is a perspective view showing a power generator using a composite sound and heat insulating board embodying the present invention as a structural member thereof.
Figure 9:
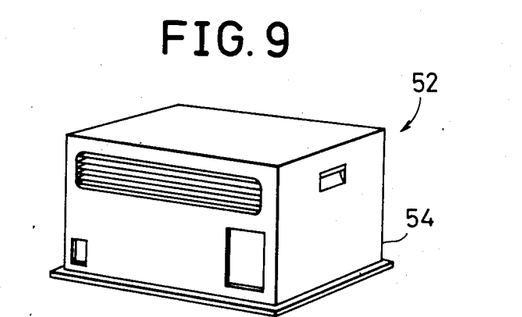
FIG. 9 is a perspective view showing an air conditioner unit using a composite sound and heat insulating board embodying the present invention as a structural member thereof.

Each of the embodiments of a composite sound and heat insulating board as hereinbefore described with reference to FIGS. 1 to 4 of the drawings will find a wide variety of practical applications where insulation of sound and heat is required. Examples of the composite board used on a power driven vehicle are shown in FIGS. 5 to 7. FIG. 5 shows an air cooled internal combustion engine 34 for a motorcycle or an automotive vehicle using the composite board embodying the present invention as a structural member constituting each of the fan cover 34 and the shroud 36 of the engine 38. In FIG. 6 of the drawings is shown an engine air cleaner 40 of, for example, a motorcycle using the composite board embodying the present invention as a structural member constituting the casing 42 of the air cleaner 40. FIG. 7 shows a scooter 44 using the composite board embodying the present invention as the body cover 46 thereof. The composite board embodying the present invention may be used not only as any of these structural members of a power driven vehicle but also as component members of other devices, examples of such applications being shown in FIGS. 8 and 9 of the drawings. FIG. 8 shows a portable power generator 48 which uses the composite board embodying the present invention as the housing 50 thereof. In FIG. 9 is shown an air conditioner 52 in which the composite board embodying the present invention is utilized as the casing 54 thereof. In each of the applications shown in FIGS. 5 to 9, the composite board may be constituted by any of the embodiments described with reference to FIGS. 1 to 4.

Figure 10:
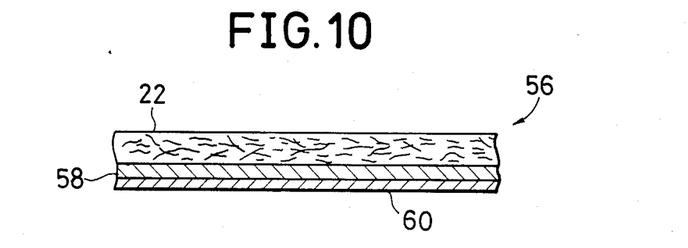
FIG. 10 is a fragmentary cross sectional view showing another preferred embodiment of a composite sound and heat insulating board according to the present invention.

FIG. 10 of the drawings shows another preferred embodiment of a composite sound and heat insulating board according to the present invention. The composite board, which is designated in its entirety by reference numeral 56, comprises a base layer constituted by a compacted fiber mat 22 and an additional layer which differs in hardness from the main layer and which is constituted by a relatively soft web 58. Similarly to its counterpart in each of the embodiments of FIGS. 1 to 4, the compacted fiber mat 22 forming part of the composite board 56 is composed of relatively long staple fibers or filaments of an organic or inorganic composition or of organic and inorganic compositions. As previously described in connection with the embodiment shown in FIG. 1, typical examples of the organic composition are polyesters and polyvinyl chloride and typical examples of the inorganic composition are ceramics and fiber glass. In the embodiment shown in FIG. 10, the compacted fiber mat 22 constituting the base layer of the composite board 56 is also assumed to be composed of fiber glass by way of example. The compacted fiber mat 22 is thus produced in a process similar to the process in which the compacted fiber mat 22 of the composite board 20 shown in FIG. 1 is produced. The mat of the fiber glass thus obtained is dipped in or sprayed or otherwise coated with a binder of an organic composition such as water glass. The mat is then baked under pressure and is thereafter cut into a desired shape as also described in connection with the composite board shown in FIG. 1. Where the compacted fiber mat 22 of the composite sound and heat insulating board 56 is formed of filaments of an organic composition which are relatively low in specific gravity, not only the board 56 as a whole is relatively light in weight but the soft web 58 will be enabled to firmly fit to the compacted fiber mat 22.

The additional layer constituted by the soft web 58 is formed of a suitable relatively soft material lower in hardness than the material of the base layer. Examples of such a material include polyvinyl chloride, polyethylene, a relatively soft silicon resin, tar pitch, resin putty, and fluid rubber such as butyl rubber. Any of these materials is applied to the surface of the compacted fiber mat 22 by dipping the compacted fiber mat 22 in the material where the material is in a liquid state. Where the material to form the soft web 58 is in the form of a sheet, the sheet of the material is bonded to the surface of the compacted fiber mat 22 with use of a suitable adhesive.

The composite sound and heat insulating board 56 composed of the compacted fiber mat 22 and the soft web 58 as above described may be deformed into any shape to suit the application of the board and may be bonded with use of a suitable adhesive or fusion bonded to any support member 60. The support member 60, which may be a panel of metal or a rigid board of a synthetic resin, forms part of a structure associated with the source or sources of noise and heat. In this instance, the composite board 56 is applied to the support member 60 preferably in such a manner that the soft web, 58 is sandwiched between the compacted fiber mat 22 and one surface of the support member 60 as shown.

In the composite sound and heat insulating board 56 embodying the present invention, the base layer constituted by the compacted fiber mat 22 serves to absorb noise and isolate heat from the support member 60. In practical applications, it is for this reason advantageous to have the compacted fiber mat 22 located closer to the source or sources of heat than the support member 60 for exploiting the heat insulating performance of the board as a whole. The soft web 58 used in combination with such a base layer is useful for suppressing the vibrations and resonance of the support member 60 and serves as a means to attenuate noises transferred to the composite board 56. For this reason, it is preferable to have the compacted fiber mat 22 located closer to the source or sources of noise than the soft web 58 for exploiting the noise insulating performance of the board as a whole. The sound absorbing performance of the compacted fiber mat 22 can be controlled by selecting the thickness and/or density of the compacted fiber mat 22.

Figure 11:
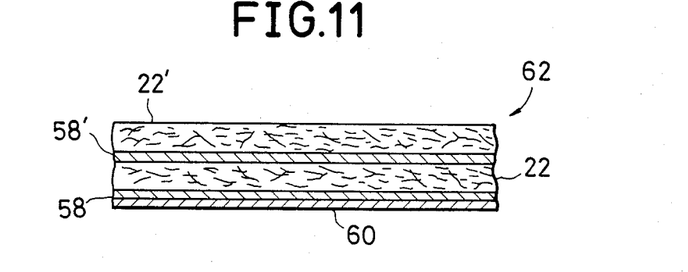
FIG. 11 is a view similar to FIG. 10 but shows a modification of the composite board illustrated in FIG. 10.
Figure 12:
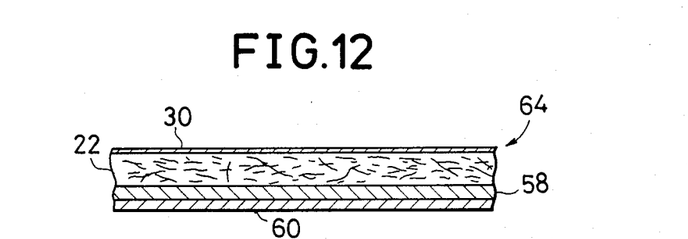
FIG. 12 is also a view similar to FIG. 10 but shows another modification of the composite board shown in FIG. 10.
Figure 13:
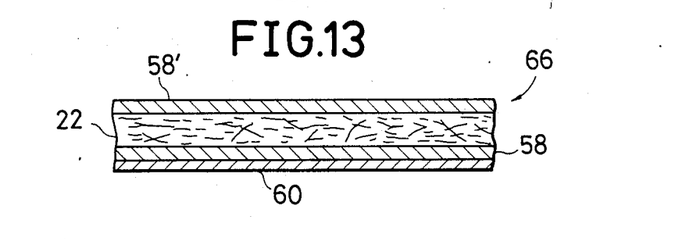
FIG. 13 is also a view similar to FIG. 10 but shows still another modification of the composite board shown in FIG. 10.

FIGS. 11 to 13 of the drawings show modifications of the embodiment hereinbefore described with reference to FIG. 10.

In FIG. 11, a composite sound and heat insulating board designated in its entirety by reference numeral 62 is constructed similarly to the composite board 26 described with reference to FIG. 2. The composite board 62 thus comprises first and second compacted fiber mats 22 and 22' and first and second soft webs 58 and 58'. Each of the first and second compacted fiber mats 22 and 22' is similar to the compacted fiber mat 22 of the composite board 56 shown in FIG. 10 and, likewise, each of the first and second soft webs 58 and 58' is similar to the soft web 58 of the composite board 56. The first compacted fiber mat 22 is securely attached to one surface of the first soft web 58, which in turn has the other of its surfaces securely attached to one surface of the second compacted fiber may 22'. The other surface of the second compacted fiber mat 22' is securely attached to one surface of the second soft web 58'. Thus, the composite board 62 shown in FIG. 11 is composed of the combination of two composite boards each similar to the composite board 56 of FIG. 10 and is adapted to provide a doubled sound and heat insulating performance as compared with the composite board 56. The composite board 62 is attached to a support member 60 with the first soft web 58 sandwiched between the support member 60 and the first compacted fiber mat 22 of the board 62. It will be apparent that the embodiment of FIG. 11 may if desired be further modified to have at least one combination of an additional compacted fiber mat and an additional soft web so that the compacted fiber mats and soft webs of the composite board are laminated alternately to one another.

In FIG. 12, a composite sound and heat insulating board designated in its entirety by reference numeral 64 is constructed similarly to the composite board 28 described with reference to FIG. 3. The composite board 64 thus comprises a foil of metal such as an aluminum foil 30 in addition to a compacted fiber mat 22 and a soft web 58 similar to those of the composite board 20 shown in FIG. 10. The compacted fiber mat 22 has one of its surfaces securely attached to one surface of the compacted fiber mat 22 and the other of its surfaces bonded or otherwise securely attached to one surface of the aluminum foil 30 so that the compacted fiber mat 20 is sandwiched between the compacted fiber mat 24 and the aluminum foil 30. The composite board 64 is attached to a support member 60 with the soft web 58 sandwiched between the support member 60 and the compacted fiber mat 22 of the board 62. The aluminum foil 30 thus forming part of the composite board 64 shown in FIG. 12 is useful for providing added sound and heat insulating performances and further for preventing the fibers forming the compacted fiber mat 22 from being disintegrated and falling out of the fiber mat during handling and use of the board 64.

In FIG. 13 of the drawings, a composite sound and heat insulating board designated in its entirety by reference numeral 66 is shown comprising a compacted fiber mat 22 similar to the compacted fiber mat of the composite board 56 shown in FIG. 10 and a pair of soft webs 58 and 58' each similar to the soft web 58 of the composite board 56 of FIG. 10. The compacted fiber mat 22 is sandwiched between the two soft webs 58 and 58' and thus has one of its surfaces securely attached to one surface of one soft web 58 and the other of its surfaces securely attached to one surface of the other soft web 58'. The composite board 66 is attached to a support member 60 with the first soft web 58 sandwiched between the support member 60 and the compacted fiber mat 22 of the board 66. When compared with the composite board 56 of FIG. 10, the composite board 66 constructed in this fashion is useful for providing increased sound and heat insulating performances and preventing the fibers forming the intermediate compacted fiber mat 22 from being disintegrated and falling out of the mat during handling and use of the board 66 as in the case of the composite board 64 shown in FIG. 12.

Figure 14:
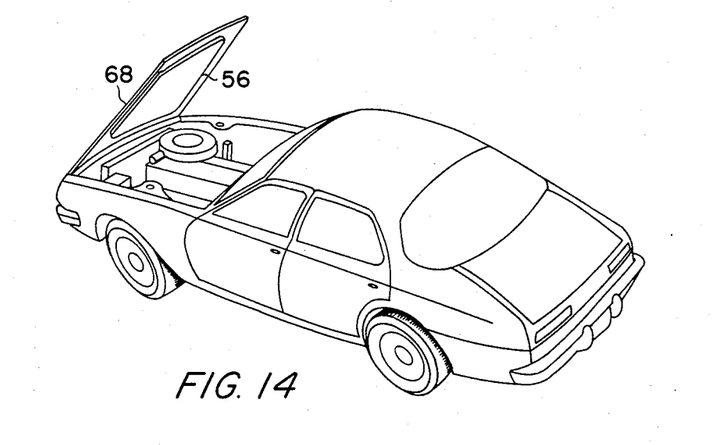
FIG. 14 is a perspective view showing an automotive vehicle using a composite sound and heat insulating board embodying the present invention.
Figure 15:
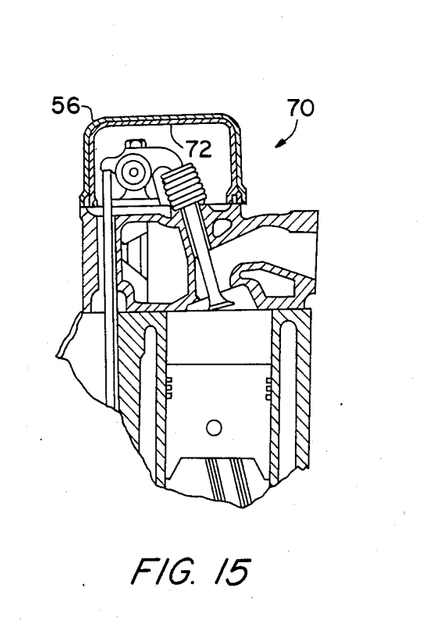
FIG. 15 is a fragmentary vertical sectional view showing a vehicle engine using a composite sound and heat insulating board embodying the present invention.
Figure 16:
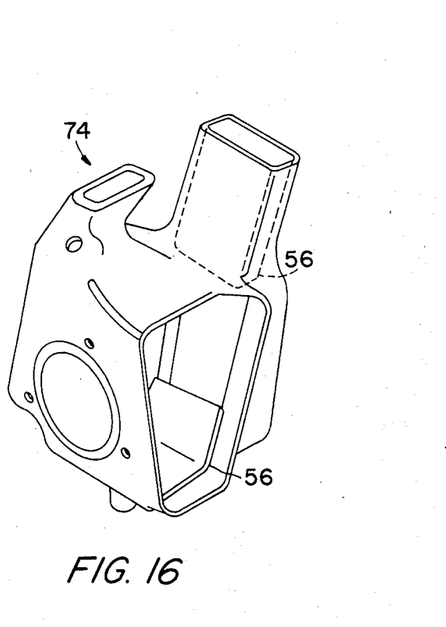
FIG. 16 is a perspective view showing an engine air cleaner using a composite sound and heat insulating board embodying the present invention.

Each of the embodiments of a composite sound and heat insulating board as hereinbefore described with reference to FIGS. 10 to 13 of the drawings will also find a wide variety of practical applications where insulation of sound and heat is required. Examples of the composite board used on a power driven vehicle are illustrated in FIGS. 14 to 16. FIG. 14 shows an automotive vehicle having the composite board 56 of FIG. 10 attached to the inner surface of the front engine hood panel. FIG. 15 shows an internal combustion engine for a motorcycle or an automotive vehicle having the composite board 56 of FIG. 10 attached to the outer surfaces of the cylinder head cover 72 of the engine 70. In FIG. 16 of the drawings is shown a casing 74 of an engine air cleaner of, for example, a motorcycle having the composite board 56 of FIG. 10 attached to the inner surfaces of the air cleaner casing 74. While the composite board described with reference to each of FIGS. 10 to 13 is advantageous particularly when used in combination with a vehicle engine, the composite board may be utilized advantageously as sound and heat insulating means associated with other devices requiring suppression of noise and heat.

What is claimed is:

1. An air cleaner casing including an air cleaner for being operatively connected to an internal combustion engine, said casing being provided on an inner surface with at least one composite sound and heat insulating board comprising a base layer consisting of a compacted mat of filaments, and an additional layer of a plastic material, one surface of the base layer being securely attached to one surface of the additional layer, said plastic material being a relatively soft material having a lower hardness relative to said mat.

2. An air cleaner casing as set forth in claims 1, in which said relatively soft material is selected from the group consisting of polyvinyl chloride and polyethylene.

3. An air cleaner casing as set forth in claim 1, in which said additional layer is constructed of a silicon resin and is lower in hardness relative to said compacted mat.

4. An air cleaner casing as set forth in claim 1, in which said additional layer is constructed of tar pitch and is lower in hardness relative to said compacted mat.

5. An air cleaner casing as set forth in claim 1, in which said additional layer is constructed of resin putty and is lower in hardness relative to said compacted mat.

6. An air cleaner casing as set forth in claim 1, in which said base layer and said additional layer respectively constitute a first base layer and a first additional layer, the composite board further comprising a second base layer consisting of a compacted mat of filaments, and a second additional layer of a material which differs in hardness relative to the compacted mat forming the second additional layer, one surface of the first base layer being securely attached to one surface of the first additional layer, one surface of the second additional layer being securely attached to the other surface of the first base layer and the other surface of the second additional layer being securely attached to one surface of the second base layer.

7. An air cleaner casing as set forth in claim 1, in which the compacted mats respectively forming said first and second base layers are composed of filaments of the same material.

8. An air cleaner casing as set forth in claim 1, in which said first and second additional layers are constructed of the same material.

9. An air cleaner casing as set forth in claim 1, further comprising a foil of metal securely attached to the other surface of said base layer.

10. An air cleaner as set forth in claim 1, in which said additional layer constitutes a first additional layer, the composite board further comprising a second additional layer of a material which differs in hardness relative to the compacted mat forming said additional layer, one surface of the base layer being securely attached to one surface of the first additional layer and the other surface of the base layer being securely attached to one surface of the second additional layer.

11. An air cleaner casing as set forth in claim 1, in which said first and second additional layers constructed of the same material.

* * * * *